(12) United States Patent
Park (10) Patent No.: US 11,014,551 B2
(45) Date of Patent: May 25, 2021

(54) VEHICLE STABILITY CONTROL SYSTEM AND METHOD

(71) Applicants: Hyundai Motor Company, Seoul (KR); Kia Motors Corporation, Seoul (KR)

(72) Inventor: Kyun Sang Park, Anseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 252 days.

(21) Appl. No.: 16/025,812

(22) Filed: Jul. 2, 2018

(65) Prior Publication Data

US 2019/0217854 A1 Jul. 18, 2019

(30) Foreign Application Priority Data

Jan. 12, 2018 (KR) .......................... 10-2018-0004524

(51) Int. Cl.
*B60W 30/045* (2012.01)
*B60W 40/114* (2012.01)
*B60W 10/20* (2006.01)
*B60W 10/184* (2012.01)
*B60T 8/24* (2006.01)
*B62D 6/00* (2006.01)
*B60T 8/1755* (2006.01)
*B60T 8/17* (2006.01)

(52) U.S. Cl.
CPC ............ *B60W 30/045* (2013.01); *B60T 8/17* (2013.01); *B60T 8/1755* (2013.01); *B60T 8/246* (2013.01); *B60W 10/184* (2013.01); *B60W 10/20* (2013.01); *B60W 40/114* (2013.01); *B62D 6/00* (2013.01); *B62D 6/003* (2013.01); *B60T 2201/04* (2013.01); *B60T 2201/16* (2013.01); *B60T 2250/03* (2013.01); *B60T 2260/02* (2013.01); *B60T 2270/30* (2013.01);

(Continued)

(58) Field of Classification Search
CPC .. B60W 30/045; B60W 10/184; B60W 10/20; B60W 40/114; B60W 2552/15; B60W 2520/10; B60W 2520/125; B60W 2520/14; B60W 2540/18; B60W 2710/18; B60W 2710/207; B60T 8/17; B60T 8/1755; B60T 8/246; B60T 2201/04; B60T 2201/16; B60T 2250/03; B60T 2260/02; B60T 2270/30; B62D 6/00; B62D 6/003
See application file for complete search history.

(56) References Cited

U.S. PATENT DOCUMENTS

2006/0129291 A1* 6/2006 Lu ........................ B60T 8/17554
701/36
2007/0225882 A1* 9/2007 Yamaguchi ......... B60W 30/095
701/36

(Continued)

FOREIGN PATENT DOCUMENTS

KR 10-1558761 B1 10/2015
KR 20160039460 A * 4/2016

*Primary Examiner* — Hunter B Lonsberry
*Assistant Examiner* — Elizabeth Yang
(74) *Attorney, Agent, or Firm* — Morgan, Lewis & Bockius LLP (57) ABSTRACT

A vehicle stability control system and a vehicle stability control method which are capable of more improving lateral stability of a vehicle when the vehicle is turning on a descent inclined road, may enable the vehicle to turn along a turning trace intended by a driver through cooperative control of active front steering (AFS) control and an electronic stability control (ESC) when the vehicle is turning on the descent inclined road.

7 Claims, 7 Drawing Sheets

(52) U.S. Cl.
CPC ... *B60W 2520/10* (2013.01); *B60W 2520/125* (2013.01); *B60W 2520/14* (2013.01); *B60W 2540/18* (2013.01); *B60W 2552/15* (2020.02); *B60W 2710/18* (2013.01); *B60W 2710/207* (2013.01)

(56) References Cited

U.S. PATENT DOCUMENTS

| | | | |
|---|---|---|---|
| 2012/0078470 A1* | 3/2012 | Hirao | B60W 30/025 701/38 |
| 2013/0144476 A1* | 6/2013 | Pinto | B60T 8/17555 701/22 |
| 2014/0249723 A1* | 9/2014 | Pilutti | B60D 1/245 701/42 |
| 2014/0303849 A1* | 10/2014 | Hafner | B60W 50/14 701/42 |
| 2016/0039456 A1* | 2/2016 | Lavoie | B60D 1/62 701/41 |
| 2016/0214645 A1* | 7/2016 | Owen | B60W 10/20 |
| 2016/0349751 A1* | 12/2016 | Sugimoto | B60W 10/06 |
| 2017/0232958 A1* | 8/2017 | Hata | B60W 10/08 701/22 |
| 2020/0031357 A1* | 1/2020 | Ling | B60W 30/18127 |

* cited by examiner

VEHICLE STABILITY CONTROL SYSTEM AND METHOD

CROSS-REFERENCE TO RELATED APPLICATION

The present application claims priority to Korean Patent Application No. 10-2018-0004524 filed on Jan. 12, 2018, the entire contents of which is incorporated herein for all purposes by this reference.

BACKGROUND OF THE INVENTION

Field of the Invention

The present invention relates to a vehicle stability control system and a vehicle stability control method. More particularly, it relates to a vehicle stability control system and a vehicle stability control method for improving stability of a vehicle when the vehicle is turning on a descent inclined road.

Description of Related Art

Generally, an electronic stability control (ESC) system is a device configured to control an attitude of a vehicle to prevent instability of a vehicle driving, and when an unstable behavior of the vehicle different from an intent of a driver occurs, the ESC system improves stability of the vehicle by reducing an engine torque or performing braking control on each wheel.

The ESC system determines whether to execute the braking control by determining a movement of the vehicle using a yaw rate sensor for detecting a yaw rate of the vehicle on the basis of a driver steering input.

The ESC system estimates a vehicle speed using a wheel speed sensor, determines an intent of the driver through a steering angle sensor, and determines an unstable behavior (understeer, oversteer, and the like) of the vehicle through a yaw rate sensor.

Understeer and oversteer are known as unstable behaviors of a vehicle.

Among the unstable behaviors, the understeer refers to a phenomenon in which a turning radius of a vehicle becomes larger due to front tire force saturation unlike an intent of a driver, and in the instant case, the ESC system performs an engine torque limitation or braking control for a wheel in a turning inward direction thereof.

The oversteer is a phenomenon in which a turning radius of the vehicle becomes smaller than a turning radius intended by the driver due to rear tire force saturation and, in a severe case, spinout occurs, and in the instant case, the ESC system performs braking control on a wheel in a turning outward direction to stabilize a behavior of the vehicle.

The ESC system is a device configured to control stability of the vehicle and becomes a backbone in cooperative or integrated control with a new chassis technique, and various additional function logics related to the ESC system are being developed.

Figure 10:
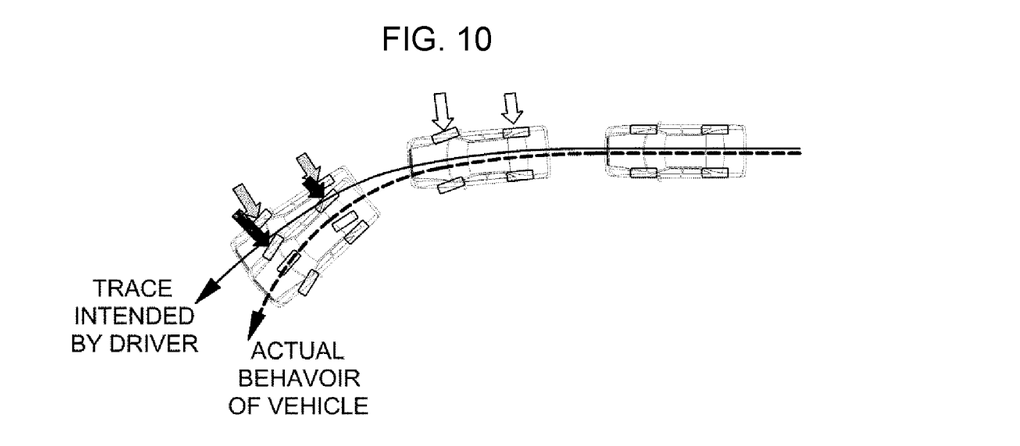
FIG. 10 is a diagram for describing a problem when the vehicle is turning on a descent inclined road.

Meanwhile, when the vehicle is traveling on a descent inclined road, unlike a situation in which the vehicle is traveling on a flat ground, a load transfer to a front wheel occurs excessively, and in the instant case, when the vehicle is turning, a side force acting on the front wheel increases as shown in FIG. 10 and thus a turning radius becomes smaller than that intended by the driver, such that possibility of an accident increase.

That is, since a load applied the front wheel becomes relatively greater than that applied to a rear wheel, a side force of the front wheel becomes greater than that thereof on a flat ground when the vehicle is turning and thus the turning radius becomes smaller, and when the driver does not perform an appropriate counter steering with respect to the smaller turning radius, a roll over occurs in the worst case.

When the vehicle is turning on the descent inclined road, a more dangerous thing is that the turning radius becomes smaller due to the load transfer as well as the vehicle is in a reverse bank situation resulting from the smaller turning radius such that possibility of a roll over increases rapidly.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an improved vehicle stability control system and an improved vehicle stability control method which are configured for more improving stability of a vehicle in a lateral direction when the vehicle is turning on a descent inclined road.

In an exemplary embodiment of the present invention, a vehicle stability control method may include determining, by a controller, whether a vehicle is turning on a descent inclined road, when the vehicle is determined as turning on the descent inclined road, determining, by the controller, a basic target yaw rate according to a steering angle and a vehicle speed and correcting the determined basic target yaw rate, determining, by the controller, a target yaw moment on the basis of an error between an actual yaw rate of the vehicle and the corrected target yaw rate, determining, by the controller, a correction value of a front wheel steering angle and a control amount of a biased braking torque according to the target yaw moment, performing, by a front wheel steering angle correction device, front wheel steering correction according to the determined correction value of the front wheel steering angle and performing braking control on an outside turning wheel according to the determined control amount of the biased braking torque.

In another exemplary embodiment of the present invention, a vehicle stability control system may include a sensing portion configured to detect vehicle information including a yaw rate of a vehicle, a steering angle thereof, and a vehicle speed, a controller configured to receive the detected vehicle information from the sensing portion and determine a target yaw rate for a current steering angle and a current vehicle speed, a front wheel steering angle correction device configured to correct a steering angle of a front wheel, and a braking portion configured to brake each of wheels according to a braking torque value determined by the controller, wherein the controller is configured to determine whether the vehicle is turning on a descent inclined road, and when the vehicle is determined as turning on the descent inclined road, the controller is configured to correct the target yaw rate is corrected and determine a target yaw moment on the basis of an error between an actual yaw rate of the vehicle and the corrected target yaw rate, the controller is configured to determine a correction value of a front wheel steering angle and a control amount of a biased braking torque according to the determined target yaw moment, and the front wheel steering angle correction device performs front wheel steering correction according to the determined correction value of the front wheel steering angle, and the braking portion performs braking control on the outside turning wheel according to the determined control amount of the biased braking torque.

Other aspects and exemplary embodiments of the disclosure are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and may include hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the disclosure are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Throughout this disclosure, when an element is referred to as "comprising" a component, it means that the element can further include other components, not excluding the other components unless specifically stated otherwise.

Provided herein are an improved vehicle stability control system and an improved vehicle stability control method which are configured for more improving stability of a vehicle in a lateral direction when the vehicle is turning on a descent inclined road.

To the present end, various aspects of the present invention provide a vehicle stability control system and a vehicle stability control method which are configured for effectively stabilizing a behavior of a vehicle when the vehicle is turning on a descent inclined road through cooperative control between an electronic stability control (ESC) system and an active front steering (AFS) system.

Hereinafter, a vehicle stability control system according to an exemplary embodiment of the present invention will be described in detail with reference to the accompanying drawings.

Figure 1:
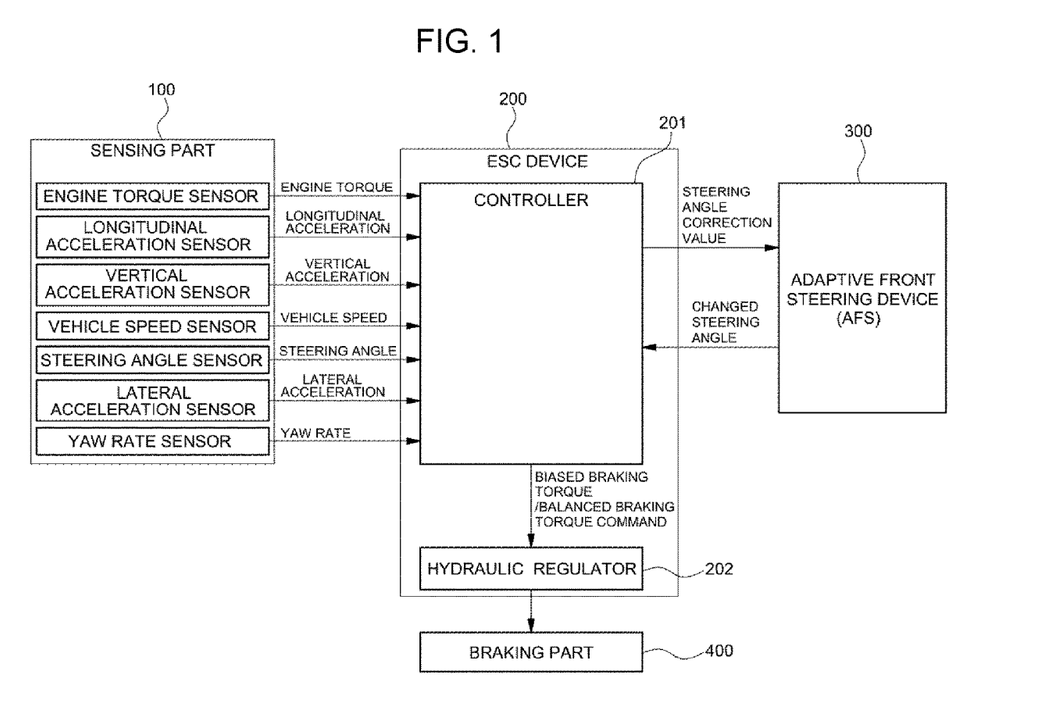
FIG. 1 is a diagram illustrating a vehicle stability control system according to an exemplary embodiment of the present invention.

FIG. 1 is a diagram illustrating a vehicle stability control system according to an exemplary embodiment of the present invention.

As shown in FIG. 1, the vehicle stability control system according to the exemplary embodiment of the present invention may include a sensing portion 100 having a plurality of sensors for detecting vehicle state information.

The reason for a conventional ESC system why it is difficult to determine a longitudinal descent inclined road is that there is a limit to estimation of an inclined road since a longitudinal acceleration sensor value is affected due to braking or acceleration. However, as various new chassis techniques are applied to a vehicle, a vertical acceleration values may be obtained in addition to longitudinal and lateral accelerations obtained in the existing ESC system. A vehicle having an electronic controlled suspension (ECS) system may obtain vertical acceleration of a vehicle body (sprung mass) as well as a vertical acceleration value thereof because a vertical acceleration sensor of a wheel is provided at the vehicle.

In an exemplary embodiment of the present invention, various sensors may be provided to monitor measured values of a vertical acceleration component as well as a longitudinal acceleration component and a lateral acceleration component. Furthermore, sensors may be provided to measure an engine torque, a vehicle speed, a steering angle, and a yaw rate value.

The vehicle stability control system according to the exemplary embodiment of the present invention is configured to include an ESC device 200 having a controller 201 configured to perform vehicle stability control using vehicle information received from the sensing parts 100.

Regarding the aforementioned, the ESC device 200 of FIG. 1 is the same as a conventional ESC system provided at a vehicle, but the present invention is not limited to an example including the conventional ESC system. Any configuration may be applied to the ESC device 200 according to an exemplary embodiment of the present invention as long as it can determine a steering angle correction value and control a braking torque of each wheel under the control of the controller 201, performing balanced braking or biased braking.

A hydraulic regulator 202 is preferably provided at the ESC device 200 and is connected to a wheel cylinder of each wheel via a hydraulic line. That is, the hydraulic line is connected to a braking portion 400 configured to apply a braking torque to each wheel, and the braking portion 400 may be configured to control an operation of the hydraulic regulator 202 for opening or closing a value and adjust a hydraulic pressure delivered to each wheel, appropriately controlling an amount of braking torque. Configurations of the ESC device 200 and the braking portion 400 are well-known, and thus descriptions thereof will be omitted herein.

The controller 201 may be configured to determine an amount of biased braking torque and/or an amount of balanced braking torque, which are required for vehicle stability control, from the vehicle information transmitted from sensing portion 100 and control the hydraulic regulator 202 and the braking portion 400 according to the determined amount of torque for the vehicle stability control.

Furthermore, the vehicle stability control system according to the exemplary embodiment of the present invention includes an adaptive front steering (AFS) device 300 configured to correct a front wheel steering angle according to the steering angle correction value determined from the controller 201.

The AFS device 300 is a device configured to correct the front wheel steering angle according to a traveling state of a vehicle and includes configurations for steering angle correction. Meanwhile, a configuration of the AFS device 300 is also known, and thus a detailed description thereof will be omitted herein.

In an exemplary embodiment of the present invention, the AFS device 300 is employed to resolve a problem in that a turning trace is reduced on a descent inclined road and is used to correct a steering angle within an allowable range to prevent reduction of the turning trace.

Figure 2:
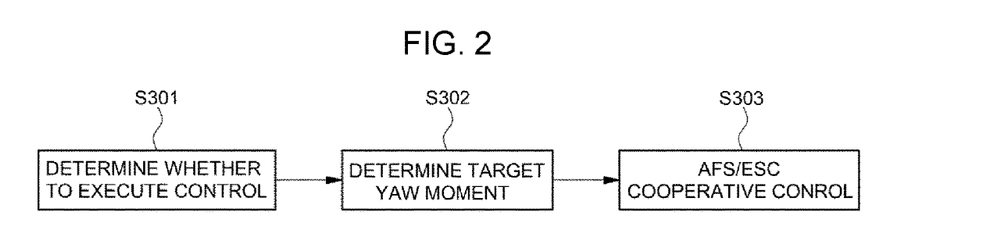
FIG. 2 is a diagram illustrating a control flow of a vehicle stability control method according to an exemplary embodiment of the present invention.

A schematic process of performing the vehicle stability control by the devices having the above-described configurations is shown in FIG. 2.

That is, as shown in FIG. 2, the vehicle stability control system according to the exemplary embodiment of the present invention includes an operation S301 of determining whether to execute the vehicle stability control, an operation S302 of determining a target yaw moment, and an operation S303 of performing AFS/ESC cooperative control on the basis of the determined target yaw moment.

As shown in FIG. 1, the controller 201 receives in real-time information such as an engine torque, longitudinal acceleration, vertical acceleration, a vehicle speed, a steering angle, a lateral acceleration, and a yaw rate from the sensing portion 100.

The controller 201 performs vehicle control to stabilize a behavior of a vehicle through steering angle correction control and wheel braking control according to the information input from the sensing portion 100.

To the present end, the controller 201 first determines whether to execute control for performing the vehicle stability control according to the present embodiment (S201). In the instant case, the controller 201 determines whether to execute the control according to a predetermined control execution condition, and the predetermined control execution condition is set on the basis of a state in which the vehicle is turning on a descent inclined road. A case in which a steering angle according to an intent of a driver is equal to or greater than a reference value and the vehicle is traveling on the descent inclined road may be set to a control execution condition. At the present point, a steering angle condition may be configured to determine whether the vehicle is turning by comparing a parameter related to the steering angle with the reference value.

Meanwhile, whether the vehicle is located on the descent inclined road determines whether the vehicle is traveling on the descent inclined road from a measured longitudinal acceleration value and a measured vertical acceleration value of the vehicle.

Figure 3:
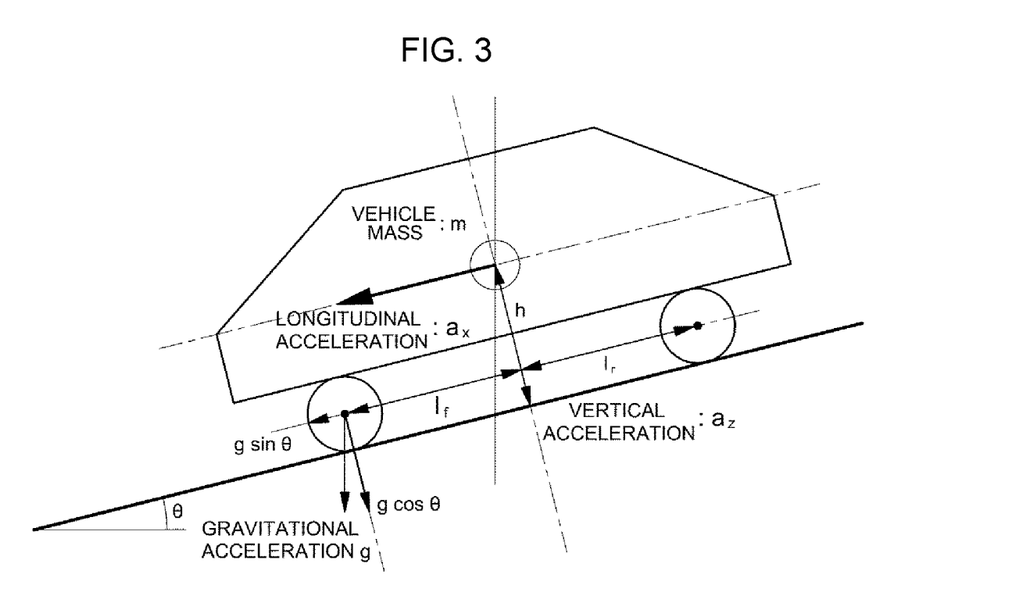
FIG. 3 is a diagram illustrating a vehicle model on a descent inclined road.
Figure 4:
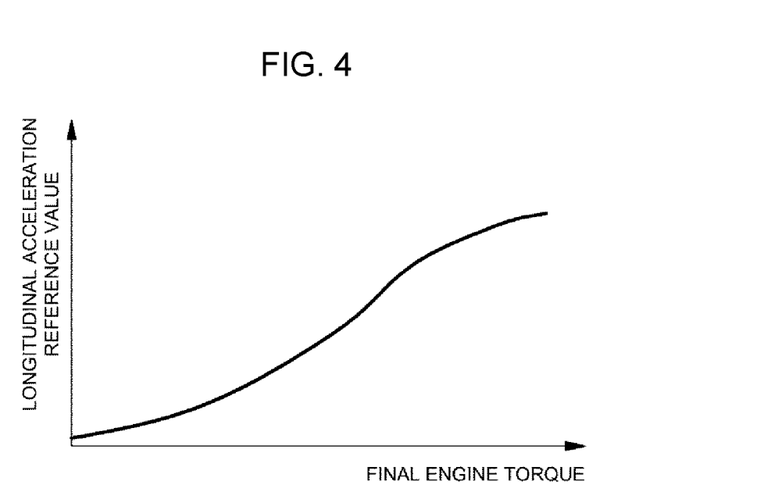
FIG. 4 is a diagram illustrating an example of a longitudinal acceleration reference value map matched to a final engine torque.

Regarding the aforementioned, FIG. 3 is a diagram illustrating a vehicle model on a descent inclined road, and FIG. 4 is a diagram illustrating an example of a longitudinal acceleration reference value map matched to a final engine torque.

The controller 201 includes a map for correlation between a final engine torque and longitudinal acceleration when the vehicle is traveling on a flat ground as shown in FIG. 4. Here, the final engine torque refers to an engine torque transmitted to an actual driving wheel except for an aerodynamic drag component of the engine torque according to a vehicle speed.

Therefore, when current longitudinal acceleration is measured on the basis of the map between an engine torque and longitudinal acceleration and the measured current longitudinal acceleration is greater than a reference value for a current engine torque, the vehicle may be determined as being located on a descent inclined road.

Meanwhile, when the descent inclined road is determined with only a longitudinal acceleration sensor value, an error may occur due to a weight variation of the vehicle or influence of a wind speed. That is, even when the longitudinal acceleration sensor value exceeds a longitudinal acceleration reference value, the vehicle may not be traveling on the descent inclined road.

Therefore, in an exemplary embodiment of the present invention, whether a vehicle is traveling on a descent inclined road is primarily determined on the basis of a measured longitudinal acceleration value, and additionally, a process of determining whether the vehicle is traveling on the descent inclined road is performed on the basis of a vertical acceleration value.

As shown in FIG. 3, a vertical acceleration value az is smaller than a gravitational acceleration value g when the vehicle is traveling on the descent inclined road due to an inclination θ of a road surface. Therefore, whether the vehicle is traveling on the descent inclined road may be determined by a ratio σ between the vertical acceleration value az and the gravitational acceleration value g.

$$\sigma = \frac{a_z}{g} \qquad \text{[Equation 1]}$$

That is, when the ratio σ between the vertical acceleration value az and the gravitational acceleration value g according to Equation 1 is less than 1 and a condition for longitudinal acceleration is satisfied, the vehicle is determined as traveling on the descent inclined road.

Thus, by considering both a longitudinal acceleration component and a vertical acceleration component, reliability of determining whether the vehicle is traveling on the descent inclined road may be improved.

When the vehicle is determined as traveling and turning on the descent inclined road, the controller 201 corrects a target yaw rate and generates a target yaw moment on the basis of the corrected target yaw rate and an actual yaw rate of the vehicle.

The controller 201 is configured to determine a basic target yaw rate according to a steering angle and a vehicle speed and correct the determined basic target yaw rate.

Figure 5:
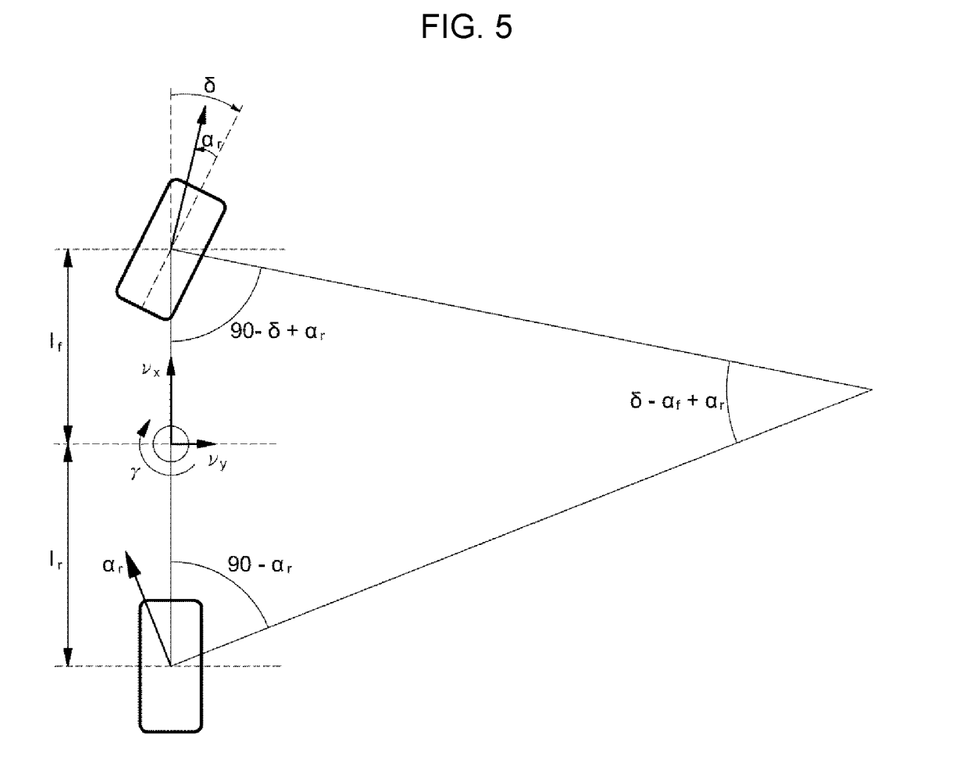
FIG. 5 is a diagram illustrating a vehicle model for determining a basic target yaw rate.

The basic target yaw rate refers to an Ackerman yaw rate and the basic target yaw rate may be derived as the following Equation 2 on the basis of a vehicle model shown in FIG. 5.

$$\gamma_{ack} = \frac{v}{l_f + l_r} \delta \frac{1}{1 + \frac{v^2}{v_{ch}^2}}, \qquad \text{[Equation 2]}$$

$$\text{where } v_{ch}^2 = \frac{C_f C_r (l_f + l_r)^2}{m(C_r l_r - C_f l_f)}$$

Here, $\gamma_{ack}$ is the Ackerman yaw rate, v is the vehicle speed, δ is the steering angle, αf is a front wheel slip angle, αr is a rear wheel slip angle, $l_f$ is a distance from the center of a front wheel to the center of the vehicle, $l_r$ is a distance from the center of a rear wheel to the center of the vehicle, $C_f$ is lateral stiffness of a front wheel tire, $C_r$ is lateral stiffness of a rear wheel tire, m is a vehicle weight, and $v_{ch}$ is a characteristic speed value obtained from a vehicle specification.

The controller 201 receives the vehicle speed and the steering angle from the sensing portion 100 and determines a basic target yaw rate for the vehicle speed and the steering angle according to Equation 2.

Meanwhile, according to the exemplary embodiment of the present invention, the basic target yaw rate is limited such that a behavior of the vehicle may be prevented from becoming unstable and the vehicle may move along a turning trace required by the driver.

Figure 6:
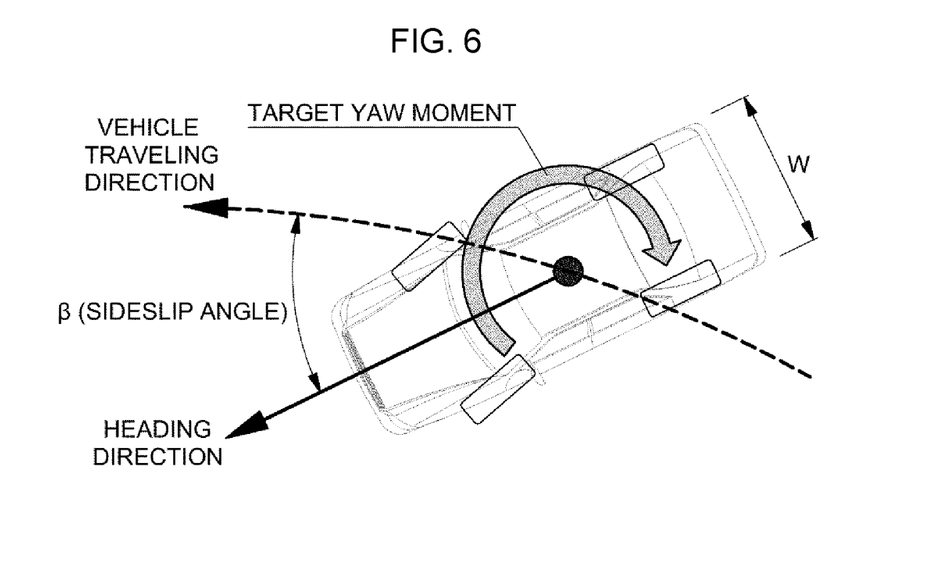
FIG. 6 is a diagram illustrating occurrence of a sideslip in a turning vehicle.

FIG. 6 is a diagram illustrating occurrence of a sideslip in a turning vehicle, and when the target yaw rate increases, a sideslip angle β between a vehicle traveling direction and a vehicle heading direction increases as shown in FIG. 6. To prevent divergence of the sideslip, the yaw rate is limited on the basis of the lateral acceleration in the exemplary embodiment of the present invention.

Meanwhile, even when the target yaw rate is limited on the basis of the lateral acceleration, the turning trace may be reduced than a turning trace intended by the driver.

When the vehicle is traveling on the descent inclined road, a front wheel side force becomes greater than a rear wheel side force due to a load transfer to a front wheel, but there is no significant difference in terms of a summed side force at a vehicle center of gravity such that the lateral acceleration is not significantly varied in terms of the vehicle. However, as the front wheel side force becomes larger and the rear wheel side force becomes smaller, the turning trace is reduced than the turning trace intended by the driver such that a process of limiting the target yaw rate on the basis of the vertical acceleration is additionally performed to prevent the reduction of the turning trace.

Therefore, in the exemplary embodiment of the present invention, determining a first target yaw rate limit value for preventing divergence of the sideslip angle and a second target yaw rate limit value for preventing reduction of the turning trace on the descent inclined road on the basis of the vertical acceleration component, and correcting for limiting the target yaw rate using the first and second target yaw rate limit values are performed.

The first target yaw rate limit value prevents the divergence of the sideslip angle, and to prevent the divergence of the sideslip angle, a product of the sideslip angle β and a variation β' of the sideslip angle becomes a negative value such that sideslip angle β should converge to "0."

Therefore, the sideslip angle does not diverge only when a condition such as the following condition 3 should be satisfied.

$$\beta\dot{\beta} = \beta\left(\frac{a_y}{v_x} - \gamma\right) \le 0 \qquad \text{[Equation 3]}$$

Here, $v_x$ is a longitudinal velocity value and $a_y$ is lateral acceleration value.

In the present point, when β≥0 (γ<0), it should be $a_y/v_x \le \gamma$, and when β<0 (γ>0), it should be $a_y/v_x \ge \gamma$. Consequently, when the above-described two cases are combined, the sideslip angle does not diverge when the yaw rate is limited as in Equation 4.

$$|\gamma| \le \frac{|a_y|}{v_x} \qquad \text{[Equation 4]}$$

Consequently, the first target yaw rate limit value $\gamma_{max1}$ is determined according to the longitudinal vehicle speed $v_x$ and the lateral acceleration $a_y$ as in the following Equation 5, and the target yaw rate γ is set so as not to exceed the first target yaw rate limit value.

$$\gamma_{max1} = \frac{|a_y|}{v_x} \qquad \text{[Equation 5]}$$

Meanwhile, as described above, to prevent the reduction of the turning trace on the descent inclined road, limiting and correcting the target yaw rate are additionally performed on the basis of the measured vertical acceleration value $a_z$.

That is, as a term for a descent inclination, an inclination weight value η is set to a value obtained by multiplying a gain to the ratio σ between the vertical acceleration value $a_z$ and the gravitational acceleration value g in Equation 1.

$$\eta = \text{gain}\frac{a_z}{g} \qquad \text{[Equation 6]}$$

Consequently, the inclination weight value η is multiplied to the first target yaw rate limit value as in the following Equation 7, obtaining the second target yaw rate limit value.

$$\gamma_{max2} = \frac{|a_y|}{v_x}\eta \qquad \text{[Equation 7]}$$

Here, the $a_y$ is the lateral acceleration value and a gain value c1 for determining the inclination weight value η is set in the range of 0<c1<1, and the gain value c1 may appropriately be selected by tuning.

Figure 7:
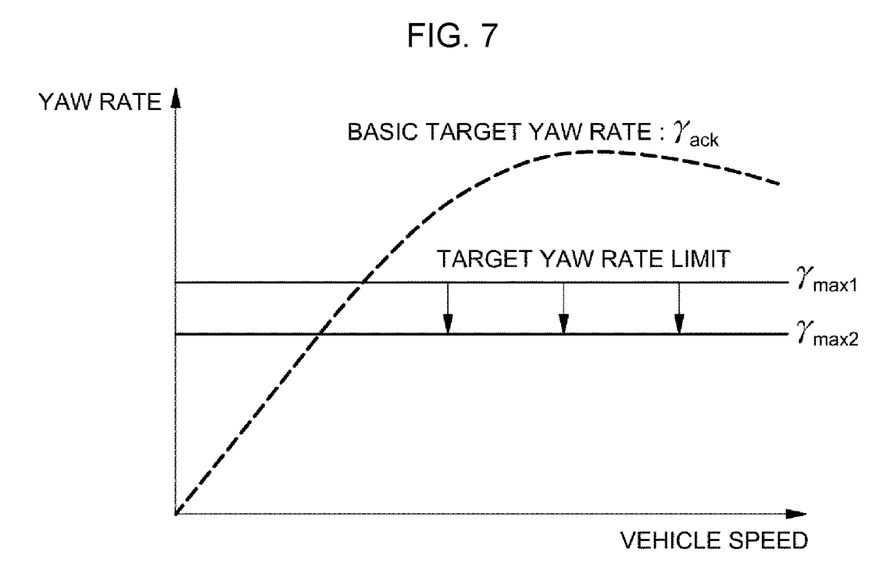
FIG. 7 is a graph illustrating correction of a target yaw rate according to a target yaw rate limit.

FIG. 7 is a graph illustrating correction of the target yaw rate according to the target yaw rate limit.

In FIG. 7, a curve indicated by a dotted line is a basic target yaw rate curve, and the basic target yaw rate is corrected so as not to exceed the first target yaw rate limit and the second target yaw rate limit.

When the target yaw rate is corrected as described above, a target yaw moment value is generated on the basis of the corrected target yaw rate to determine whether to perform the vehicle stability control.

That is, a current yaw rate of the vehicle is measured through a yaw rate sensor, and the measured yaw rate is compared with the corrected target yaw rate. At the present point, when the measured yaw rate is less than or equal to the corrected target yaw rate, the controller 201 determines a situation in which subsequent control is not required and terminates the vehicle stability control.

On the other hand, when the measured yaw rate is greater than the corrected target yaw rate, control is performed to decrease the actual yaw rate below the target yaw moment. To the present end, the controller 201 determines the target yaw moment on the basis of an error between the actual yaw rate $\gamma_{real}$ and the corrected target yaw rate $\gamma_{tar}$ of the vehicle.

The target yaw moment $M_{tar}$ is determined by the following Equation 8.

$$M_{tar}=\text{gain2}(\gamma_{tar}-\gamma_{real}) \qquad \text{[Equation 8]}$$

When the target yaw moment is determined, a correction value of a front wheel steering angle and a control amount of a biased braking torque are determined according to the determined target yaw moment.

That is, according to the exemplary embodiment of the present invention, in the controlling of an attitude of the vehicle according to the target yaw moment determined through the above-described process, the front wheel steering angle is corrected and, as necessary, biased braking control is selectively performed on an outside turning wheel.

For example, on the basis of the vehicle stability control system as shown in FIG. 1, a front wheel steering correction is performed by a front wheel steering angle correction device according to the determined correction value of the front wheel steering angle, and the braking control is performed on the outside turning wheel according to the control amount of the biased braking torque.

That is, the target yaw moment is distributed to a target yaw moment by the front wheel steering angle correction and a target yaw moment by the biased braking, and the yaw moment is primarily generated by the front wheel steering angle correction device up to a maximum correctable yaw moment, and then the yaw moment corresponding to the remaining target yaw moment is generated by the biased braking.

Therefore, only when the target yaw moment exceeds the maximum correctable yaw moment generated by the front wheel steering angle correction device, the braking portion 400 is controlled to converge on the target yaw moment by applying the biased braking torque to the outside turning wheel, such that the behavior of the vehicle may primarily be stabilized while the vehicle speed is maintained.

The front wheel steering angle correction device may be the AFS device 300 and a maximum AFS yaw moment $M_{max\_AFS}$ which is correctable by a steering angle correction device may be determined on the basis of error values of the first target yaw rate limit and the second target yaw rate limit.

$$M_{max\_AFS}=\text{gain3}(\gamma_{max1}-\gamma_{max2}) \qquad \text{[Equation 9]}$$

The maximum AFS yaw moment $M_{max\_AFS}$ determined as in Equation 9 is used to determine a yaw moment which will be distributed to the steering angle correction device, and the yaw moment which will be distributed to the steering angle correction device is set to a smaller value of the target yaw moment $M_{tar}$ and the maximum AFS yaw moment $M_{max\_AFS}$.

Consequently, when the target yaw moment $M_{tar}$ does not exceed the maximum AFS yaw moment $M_{max\_AFS}$, the target yaw moment $M_{tar}$ is entirely distributed as a yaw moment component related to a steering angle correction value. At the present point, the steering angle correction value may be determined from an AFS yaw moment $M_{AFS}$, front wheel cornering stiffness $C_f$, and the distance $l_f$ from the center of the front wheel to the center of the vehicle. Such a method of determining the steering angle correction value is known, and thus a description thereof will be substituted with the following Equation 10 for determining the steering angle correction value.

$$\text{steering angle correction value} = \frac{M_{AFS}}{C_f l_f} \qquad \text{[Equation 10]}$$

On the other hand, when the target yaw moment $M_{tar}$ exceeds the maximum AFS yaw moment $M_{max\_AFS}$, the maximum AFS yaw moment $M_{max\_AFS}$ is distributed as the steering angle correction value, and the remaining yaw moment is distributed as the yaw moment generated by the biased braking control, that is, as a yaw moment generated by the ESC device 200. Therefore, the yaw moment generated by the ESC device 200, that is, an ESC target yaw moment $M_{ESC}$ is determined by the following Equation 11.

$$M_{ESC}=M_{tar}-M_{AFS} \qquad \text{[Equation 11]}$$

The braking control of the outside turning wheel by the biased braking is the same as that in a general ESC logic, and a control amount of biased braking may be determined as $(M_{ESC})/(w/2)$.

Meanwhile, the behavior of the vehicle may become unstable as the vehicle speed increases on the descent inclined road, and thus a logic for limiting the vehicle speed may be added in the exemplary embodiment of the present invention.

To the present end, the controller 201 may be configured to determine a limit vehicle speed on the basis of the basic target yaw rate and the actual yaw rate of the vehicle and monitor whether a current vehicle speed exceeds the limit vehicle speed. When the current vehicle speed exceeds the limit vehicle speed on the basis of the aforementioned, deceleration control of the vehicle may be performed by applying a balanced braking torque to the front wheel.

The limit vehicle speed is set using a larger value of the Ackerman yaw rate (the basic target yaw rate) and a currently measured yaw rate according to a driver's steering angle relative to the current lateral acceleration, and AFS steering control and ESC braking control are performed on the basis of the limit vehicle speed.

That is, when the current vehicle speed is less than or equal to the threshold vehicle speed, balanced front wheel braking control for reducing the vehicle speed is not executed, and only control in which the target yaw moment is distributed as a target yaw moment by the AFS and a target yaw moment by the ESC.

Meanwhile, when the current vehicle speed exceeds the limit vehicle speed, the balanced braking control for the front wheel to reduce an AFS vehicle speed is executed together with the target yaw moment distribution control. That is, a yaw moment is generated by the yaw moment resulting from AFS up to the maximum AFS yaw moment, and regarding a yaw moment exceeding the maximum AFS yaw moment, the biased braking is performed on the outside turning wheel by ESC to generate an ESC yaw moment. At the present point, since the ESC device 200 may perform the balanced braking control on the front wheel to offset an increase of the vehicle speed on the descent inclined road, the controller 201 performs the braking control by adding up a control amount of biased braking on the outside turning wheel and a control amount of balanced braking on the front wheel.

Figure 8:
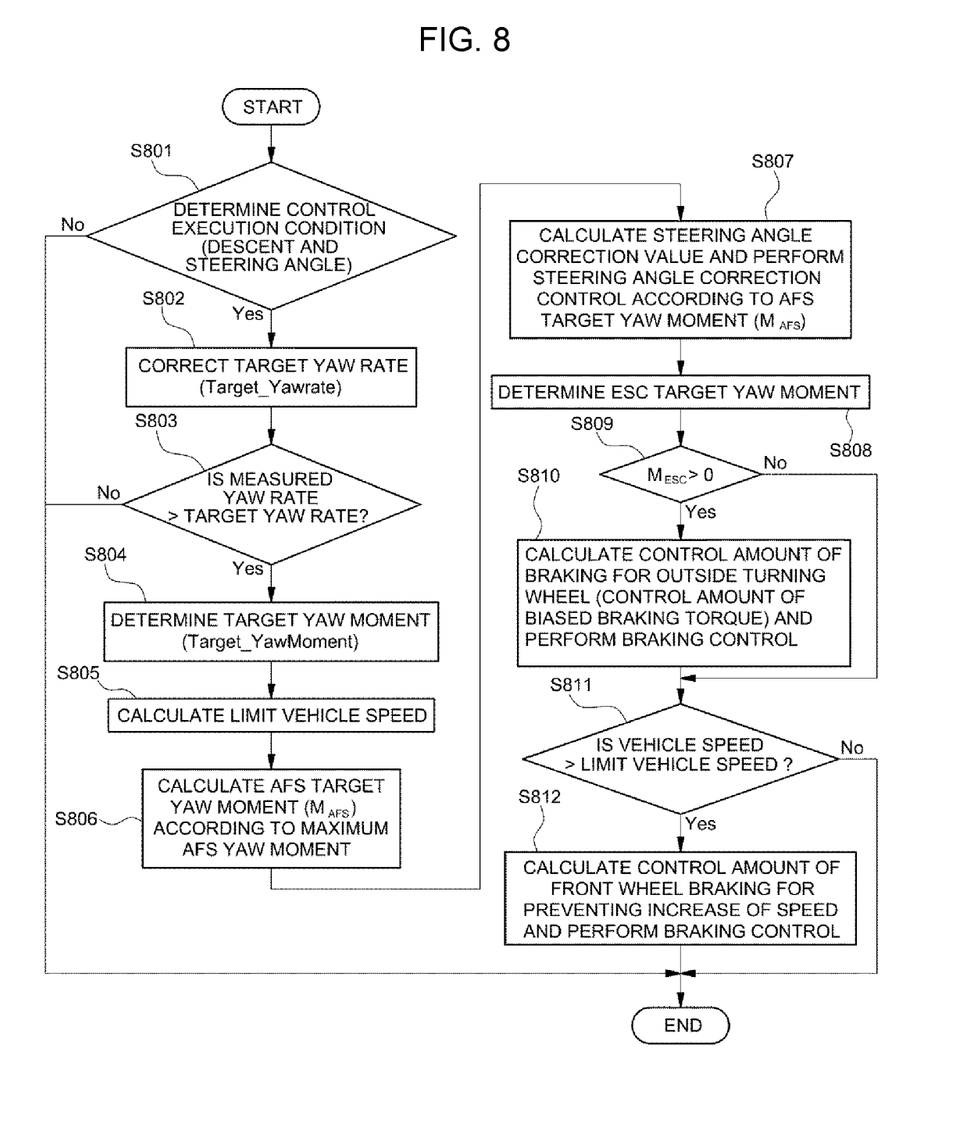
FIG. 8 is a diagram illustrating a vehicle stability control method according to an exemplary embodiment of the present invention.

A series of processes of performing the vehicle stability control on the basis of the above-described vehicle stability control system is shown in FIG. 8.

First, the controller 201 determines whether a control execution condition is satisfied (S801), and in the present operation, determining whether the vehicle is turning on a descent inclined road is performed. The control execution condition may include a condition for determining whether a road is a descent inclined road and a condition related to a steering angle.

When the vehicle does not satisfy a predetermined control execution condition, subsequent control is terminated.

On the other hand, when the vehicle satisfies the control execution condition and is turning on the descent inclined road, the controller 201 determines a basic target yaw rate according to a steering angle and a vehicle speed and corrects the determined basic target yaw rate (S802).

Thereafter, a current yaw rate of the vehicle is measured, and the measured yaw rate is compared with the corrected target yaw rate (S803). At the present point, when the measured yaw rate is less than or equal to the corrected target yaw rate, the controller 201 determines a situation in which subsequent control is not required and terminates the vehicle stability control.

On the other hand, when the measured yaw rate is greater than the corrected target yaw rate, determining a target yaw moment on the basis of an error between an actual yaw rate of the vehicle and the corrected target yaw rate is performed (S804).

According to an exemplary embodiment of the present invention, it may be configured to include determining a limit vehicle speed (S805), comparing the determined limit vehicle speed with a current vehicle speed (S811), and perform balanced braking on a front wheel according to the comparison result. Regarding the aforementioned, although FIG. 8 shows that the determining of the limit vehicle speed (S805) is performed after the determining of the target yaw moment (S804), the determining of the limit vehicle speed (S805) is not necessarily performed in the present order and may be performed according to any order as long as the limit vehicle speed can appropriately be determined before the comparing of the determined limit vehicle speed with the current vehicle speed (S811).

Meanwhile, the vehicle stability control method according to an exemplary embodiment of the present invention includes a series of operations S806 to S810 of determining a correction value of a front wheel steering angle and a control amount of a biased braking torque according to the target yaw moment determined in the previous operation S804.

In an example using the AFS device 300 as a front wheel steering angle correction device, determining an AFS target yaw moment $M_{AFS}$ at a limit of a maximum AFS yaw moment (S806), and determining the correction value of the front wheel steering angle according to the determined AFS target yaw moment $M_{AFS}$ and performing correction control on the front wheel steering angle according to the determined correction value of the front wheel steering angle (S807) are performed.

As such, determining an ESC target yaw moment $M_{ESC}$ is performed (S808), and the ESC target yaw moment $M_{ESC}$ is determined by a difference between a target yaw moment and an AFS target yaw moment as in Equation 11.

When the ESC target yaw moment $M_{ESC}$ determined in the operation (S808) step is not greater than 0 (S809), an operation S810 of generating the ESC target yaw moment $M_{ESC}$ through ESC biased braking is omitted.

On the other hand, when the ESC target yaw moment $M_{ESC}$ is greater than 0 (S809), determining a control amount of a biased braking torque for an outside turning wheel, and performing braking control on the outside turning wheel according to the control amount of the biased braking torque (S810) are performed.

During the present operation or as a subsequent operation, comparing the vehicle speed with the limit vehicle speed is performed (S811), and when the vehicle speed is greater than the limit vehicle speed, performing the braking control by applying a balanced braking torque to the front wheel (four wheels in the case of a four-wheel-drive vehicle) (S812).

Through cooperative control of AFS control and ESC as described above, it is possible to prevent the vehicle from turning along a turning trace different from that intended by the driver when the vehicle is turning on the descent inclined road.

Figure 9A:
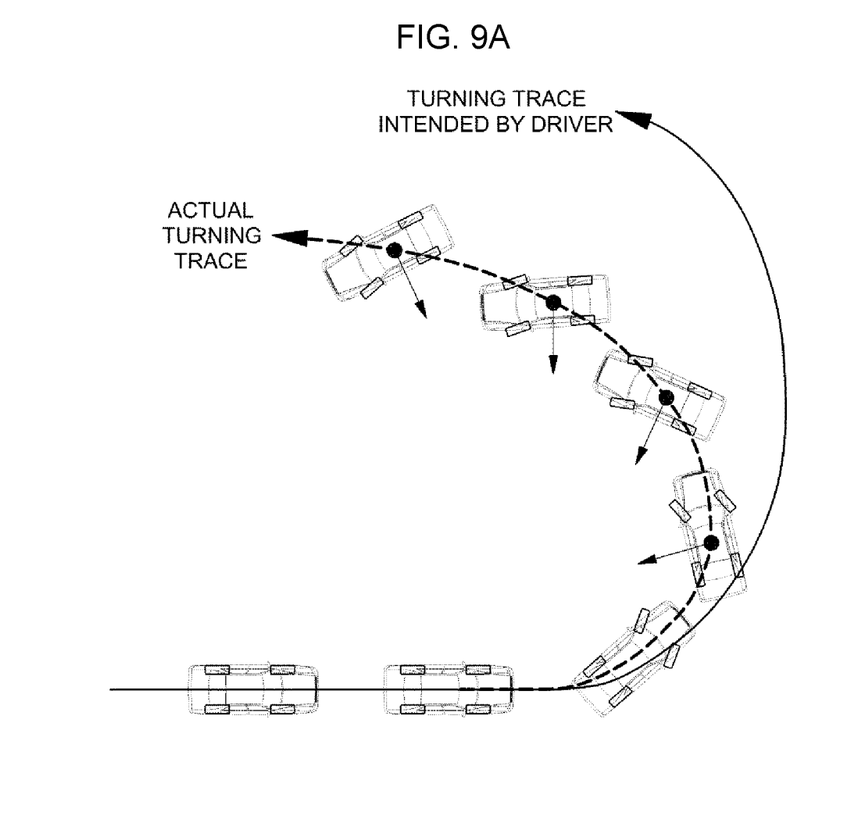
FIG. 9A is a diagram illustrating that a curvature of an actual vehicle trace is reduced than a trace intended by the driver on a descent inclined road when a vehicle is turning according to a related art.
Figure 9B:
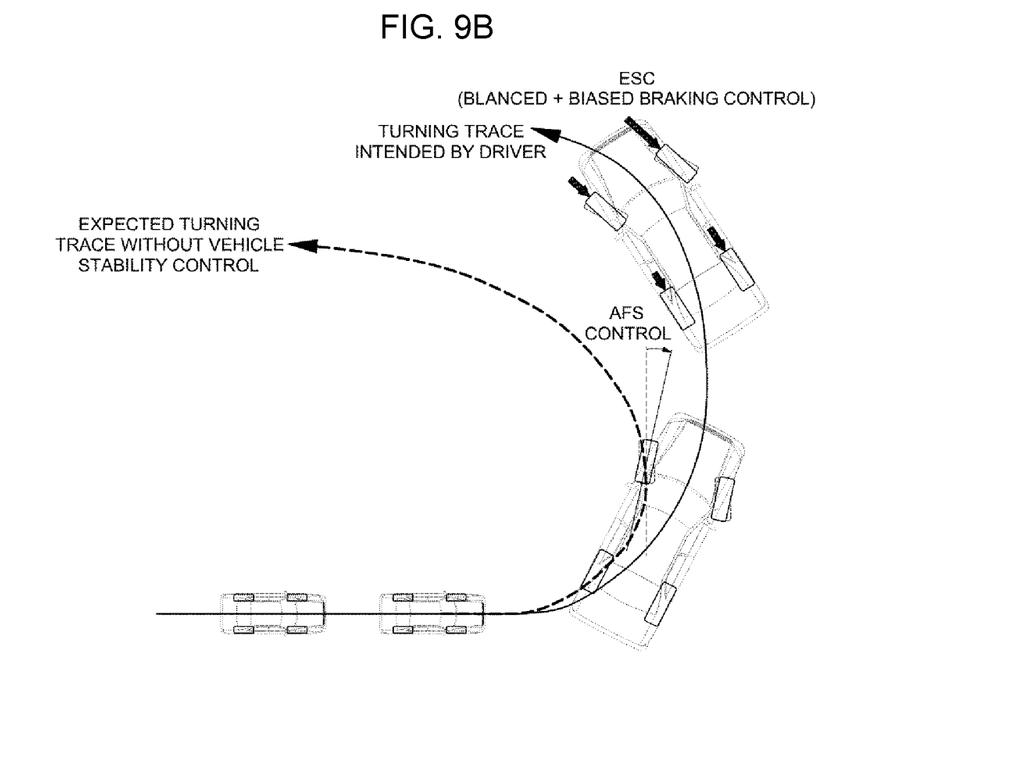
FIG. 9B is a diagram illustrating that the vehicle is turning along the trace intended by the driver according to an exemplary embodiment of the present invention.

Regarding the aforementioned, FIG. 9A is a diagram illustrating that a curvature of an actual vehicle trace is reduced than a trace intended by the driver on the descent inclined road when the vehicle is turning according to a related art, and FIG. 9B is a diagram illustrating that the vehicle is turning along the turning trace intended by the driver according to an exemplary embodiment of the present invention.

As shown in FIG. 9B, the front wheel steering angle is primarily corrected by the AFS control to response to reduction of a turning trace, while the vehicle is controlled to converge on a turning trace intended by the driver through biased braking of the ESC. Therefore, it is possible to prevent the reduction of the turning trace on the descent inclined road and thus prevent a rollover of the vehicle.

Therefore, in accordance with the vehicle stability control system and the vehicle stability control method of the present invention, even when the vehicle is turning in a state of entering into the descent inclined road, the vehicle stably turns while maintaining the turning trace intended by the driver, such that there are effects in that stability of the vehicle in a lateral direction may be improved and the rollover of the vehicle may be prevented.

Furthermore, since the steering control by the steering angle correction apparatus is primarily performed before the braking control intervenes, the, there are effects in that the intervention of the braking control may be minimized and discomfort feel of the driver may be reduced.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle stability control method, comprising:
   determining, by a controller, whether a vehicle is turning on a descent inclined road;
   when the vehicle is determined as turning on the descent inclined road, determining, by the controller, a basic target yaw rate according to a steering angle and a vehicle speed and determining a corrected target yaw rate by correcting the determined basic target yaw rate;
   determining, by the controller, a target yaw moment on a basis of an error between an actual yaw rate of the vehicle and the corrected target yaw rate;
   determining, by the controller, a correction value of a front wheel steering angle and a control amount of a biased braking torque according to the target yaw moment;
   performing, by a front wheel steering angle correction device, front wheel steering correction according to the determined correction value of the front wheel steering angle and performing braking control on an outside turning wheel of the vehicle according to the determined control amount of the biased braking torque,
   wherein the determining of whether the vehicle is turning on the descent inclined road includes determining whether the vehicle is traveling on the descent inclined road, on a basis of a measured longitudinal acceleration value and a measured vertical acceleration value of the vehicle, and
   wherein, when the vehicle is determined as turning on the descent inclined road, the target yaw moment is distributed as a target yaw moment by a front wheel steering angle correction and a target yaw moment by biased braking torque and is primarily distributed to the target yaw moment by the front wheel steering angle correction, which is correctable by the front wheel steering angle correction device, up to a maximum target yaw moment,
   wherein the determining of the target yaw moment includes: determining a target yaw rate limit at a current vehicle speed; and correcting the target yaw rate so as not to exceed the determined target yaw rate limit,
   wherein the target yaw rate limit includes a first target yaw rate limit determined according to the current vehicle speed and a lateral acceleration value and a second target yaw rate limit determined according to the current vehicle speed, the lateral acceleration value, and a vertical acceleration value,
   wherein the corrected target yaw rate is determined to not exceed the first target yaw rate limit and the second target yaw rate limit,
   wherein the first target yaw rate limit γmax1 is $$\gamma_{max1} = \frac{|a_y|}{v_x},$$

and the second target yaw $$\gamma_{max2} = \frac{|a_y|}{v_x}\eta,$$

rate limit γmax2 is $$\eta = c_1 \frac{a_z}{g}$$

wherein and 0<c1<1, and
   wherein the $v_x$ is a longitudinal vehicle speed and the $a_y$ is the lateral acceleration value, the η is an inclination weight value, the $a_z$ is the vertical acceleration value, the c1 is a gain value, and g is a gravitational acceleration.

2. The method of claim 1, further including:
   when the target yaw moment exceeds the maximum target yaw moment by the front wheel steering angle correction device, controlling a braking portion to converge on the target yaw moment by applying the biased braking torque to the outside turning wheel.

3. The method of claim 1, further including:
   determining a limit vehicle speed on a basis of the basic target yaw rate and the actual yaw rate of the vehicle; and
   comparing the current vehicle speed with the limit vehicle speed, and when the current vehicle speed exceeds the limit vehicle speed, performing the braking control of the vehicle by applying a balanced braking torque to a front wheel of the vehicle.

4. A vehicle stability control system, comprising:
   a sensing portion configured to detect vehicle information including a yaw rate of a vehicle, a steering angle thereof, and a vehicle speed;
   a controller configured to receive the detected vehicle information from the sensing portion and determine a target yaw rate for a current steering angle and a current vehicle speed;
   a front wheel steering angle correction device configured to correct a steering angle of a front wheel; and
   a braking portion configured to brake each of wheels according to a braking torque value determined by the controller, wherein the controller is configured to determine whether the vehicle is turning on a descent inclined road, and when the vehicle is determined as turning on the descent inclined road, the controller is configured to correct the target yaw rate and determine a target yaw moment on a basis of an error between an actual yaw rate of the vehicle and the corrected target yaw rate, wherein the controller is configured to determine a correction value of a front wheel steering angle and a control amount of a biased braking torque according to the determined target yaw moment, wherein the front wheel steering angle correction device performs front wheel steering correction according to the determined correction value of the front wheel steering angle, and the braking portion performs braking control on an outside turning wheel according to the determined control amount of the biased braking torque, wherein the sensing portion includes a sensor configured to measure a longitudinal acceleration value and a vertical acceleration value of the vehicle, and the controller is configured to determine whether the vehicle is traveling on the descent inclined road from a measured longitudinal acceleration value and a measured vertical acceleration value of the vehicle, and wherein when the vehicle is determined as turning on the descent inclined road, the controller distributes the target yaw moment as a target yaw moment by front wheel steering angle correction and a target yaw moment by a biased braking torque and determines the correction value of the front wheel steering angle to primarily distribute the target yaw moment to a maximum target yaw moment which is correctable by the front wheel steering angle correction device, wherein the controller is configured to determine a target yaw rate limit at the current vehicle speed and correct the target yaw rate so as not to exceed the determined target yaw rate limit, wherein the target yaw rate limit includes a first target yaw rate limit determined according to the current vehicle speed and a lateral acceleration value and a second target yaw rate limit determined according to the current vehicle speed, a lateral acceleration value, and a vertical acceleration value, and the controller corrects the target yaw rate to not exceed the first target yaw rate limit and the second target yaw rate limit, wherein the first target yaw rate limit γmax1 is $$\gamma_{max1} = \frac{|a_y|}{v_x},$$

and the second target yaw rate limit γmax2 is $$\gamma_{max2} = \frac{|a_y|}{v_x}\eta,$$

$$\eta = c_1 \frac{a_z}{g}$$

wherein and $0 < c_1 < 1$, and wherein the $v_x$ is a longitudinal vehicle speed and the $a_y$ is the lateral acceleration value, the η is an inclination weight value, the $a_z$ is the vertical acceleration value, the c1 is a gain value, and g is a gravitational acceleration.

5. The system of claim 4, wherein, when the target yaw moment exceeds the maximum target yaw moment by the front wheel steering angle correction device, the controller is configured to control the braking portion to converge on the target yaw moment by applying the biased braking torque to the outside turning wheel.

6. The system of claim 4, wherein the controller is configured to determine a limit vehicle speed on a basis of a basic target yaw rate and the actual yaw rate of the vehicle, and compare the current vehicle speed with the limit vehicle speed, and when the current vehicle speed exceeds the limit vehicle speed, the controller is configured to control the braking portion to apply a balanced braking torque to a front wheel of the vehicle.

7. A vehicle stability control method, comprising:
determining, by a controller, whether a vehicle is turning on a descent inclined road;
when the vehicle is determined as turning on the descent inclined road, determining, by the controller, a basic target yaw rate according to a steering angle and a vehicle speed and determining a corrected target yaw rate by correcting the determined basic target yaw rate;
determining, by the controller, a target yaw moment on a basis of an error between an actual yaw rate of the vehicle and the corrected target yaw rate;
determining a target yaw rate limit at a current vehicle speed, the target yaw rate limit including a first target yaw rate limit determined according to the current vehicle speed and a lateral acceleration value and a second target yaw rate limit determined according to the current vehicle speed, the lateral acceleration value, and a vertical acceleration value;
determining, by the controller, a correction value of a front wheel steering angle and a control amount of a biased braking torque according to the target yaw moment;
performing, by a front wheel steering angle correction device, front wheel steering correction according to the determined correction value of the front wheel steering angle and performing braking control on an outside turning wheel of the vehicle according to the determined control amount of the biased braking torque, wherein when the vehicle is determined as turning on the descent inclined road, the target yaw moment is distributed as a target yaw moment by a front wheel steering angle correction and a target yaw moment by biased braking torque and is primarily distributed to the target yaw moment by the front wheel steering angle correction, which is correctable by the front wheel steering angle correction device, up to a maximum target yaw moment; and
controlling a braking portion to converge on the target yaw moment by applying the biased braking torque to the outside turning wheel when the target yaw moment exceeds the maximum target yaw moment by the front wheel steering angle correction device, wherein the maximum target yaw moment by the front wheel steering angle correction device is determined based on error values of the first target yaw rate limit and the second target yaw rate limit, and wherein the yaw moment distributed to the front wheel steering angle correction device is set to a smaller value of the target yaw moment and the maximum target yaw moment by the front wheel steering angle correction device, wherein the control device is configured to determine a target yaw rate limit at the current vehicle speed and correct the target yaw rate so as not to exceed the determined target yaw rate limit, wherein the target yaw rate limit includes a first target yaw rate limit determined according to the current vehicle speed and a lateral acceleration value and a second target yaw rate limit determined according to the current vehicle speed, a lateral acceleration value, and a vertical acceleration value, and the controller corrects the target yaw rate to not exceed the first target yaw rate limit and the second target yaw rate limit, wherein the first target yaw rate limit $\gamma_{max1}$ is $$\gamma_{max1} = \frac{|a_y|}{v_x},$$

and the second target yaw rate limit $\gamma_{max2}$ is $$\gamma_{max2} = \frac{-|a_y|}{v_x}\eta,$$

$$\eta = c_1 \frac{a_z}{g}$$

wherein and $0 < c_1 < 1$, and wherein the $v_x$ is a longitudinal vehicle speed and the $a_y$ is the lateral acceleration value, the $\eta$ is an inclination weight value, the $a_z$ is the vertical acceleration value, the c1 is a gain value, and g is a gravitational acceleration.

* * * * *